United States Patent [19]
Hill et al.

[11] 3,735,880
[45] May 29, 1973

[54] TRANSFER APPARATUS

[75] Inventors: William J. Hill, Holden; Harold E. Woodrow; Kenneth L. Klusmier, both of Worcester, all of Mass.

[73] Assignee: Morgan Construction Company, Worcester, Mass.

[22] Filed: July 21, 1971

[21] Appl. No.: 164,601

[52] U.S. Cl. .............................. 214/6 DK, 214/6.5
[51] Int. Cl. ................................................ B65g 57/24
[58] Field of Search .................... 214/6.5, 6 DK, 6 H, 214/6 P, 6 G, 6 A; 271/84, 86, 88

[56] References Cited

UNITED STATES PATENTS

| | | | |
|---|---|---|---|
| 3,583,472 | 6/1971 | Yamamoto et al. | 214/6 DK |
| 3,594,977 | 7/1971 | Grasvoll | 214/6 DK |
| 3,169,646 | 2/1965 | Mason | 214/6 DK |
| 3,567,046 | 3/1971 | Reist | 214/6 DK |
| 3,488,917 | 1/1970 | Oswald et al. | 214/6 DK X |
| 3,446,368 | 5/1969 | Nelson | 214/6 DK |
| 2,065,673 | 12/1936 | Fay, Jr. | 214/6 DK |

FOREIGN PATENTS OR APPLICATIONS

| | | | |
|---|---|---|---|
| 1,256,155 | 12/1967 | Germany | 214/6 DK |

*Primary Examiner*—Robert J. Spar
*Attorney*—Chittick, Pfund, Birch, Samuels & Gauthier

[57] ABSTRACT

An apparatus for transferring elongated elements from a receiving station onto an adjacent carrier. The elements are first arranged in a layer or tier on a plurality of laterally extending support members spaced along the length of the receiving station at a level slightly above that of the carrier. The loaded support members are next extended over the carrier, after which stop members are raised to operative positions protruding between the support members at the receiving station. Thereafter, the support members are retracted, causing the elements to be stripped therefrom onto the carrier.

7 Claims, 16 Drawing Figures

TRANSFER APPARATUS

DESCRIPTION OF THE INVENTION

This invention relates generally to the art of material handling and in particular to a novel and improved apparatus for laterally transferring a layer or tier of elongated elements from a receiving station onto a laterally adjacent carrier. The invention is especially useful in the handling of product lengths such as for example the rolled sections produced by a rolling mill, although it will be appreciated from the following detailed description that other uses are also contemplated.

One of the principal objects of the present invention is to provide a transfer apparatus which maintains a tier of elongated elements in horizontal and lateral alignment during the transfer thereof from a receiving station to a position overlying a laterally adjacent carrier, and which thereafter drops the elements one by one onto the carrier to form another aligned tier thereon. A further object of the present invention is to control the attitude of the elements as they are individually dropped onto the carrier, so as to prevent the elements from twisting or tipping. A more specific object of the present invention is to arrange a plurality of elements in a tier on laterally extending support members located at a receiving station, to then advance the loaded support members to a delivery position overlying a carrier, and to then individually strip elements off of the support members in a manner which allows the middle section of each element to sag downwardly into contact with the underlying carrier or a tier previously deposited thereon, before stripping the ends of the element off of the support members. This provides a locating and control function which prevents the elements from turning or twisting as they are stripped off of the support members onto the carrier, thereby insuring that the elements are arranged on the carrier in the same manner as they were previously arranged on the support members. A further object of the present invention is to provide means for obviating the possibility of the support members being damaged in the event that they are forced upwardly inadvertently by contact with either the carrier or a tier of elements previously deposited thereon.

These and other objects and advantages of the present invention will become more apparent as the description proceeds with the aid of the accompanying drawings, in which.

Figure 1:
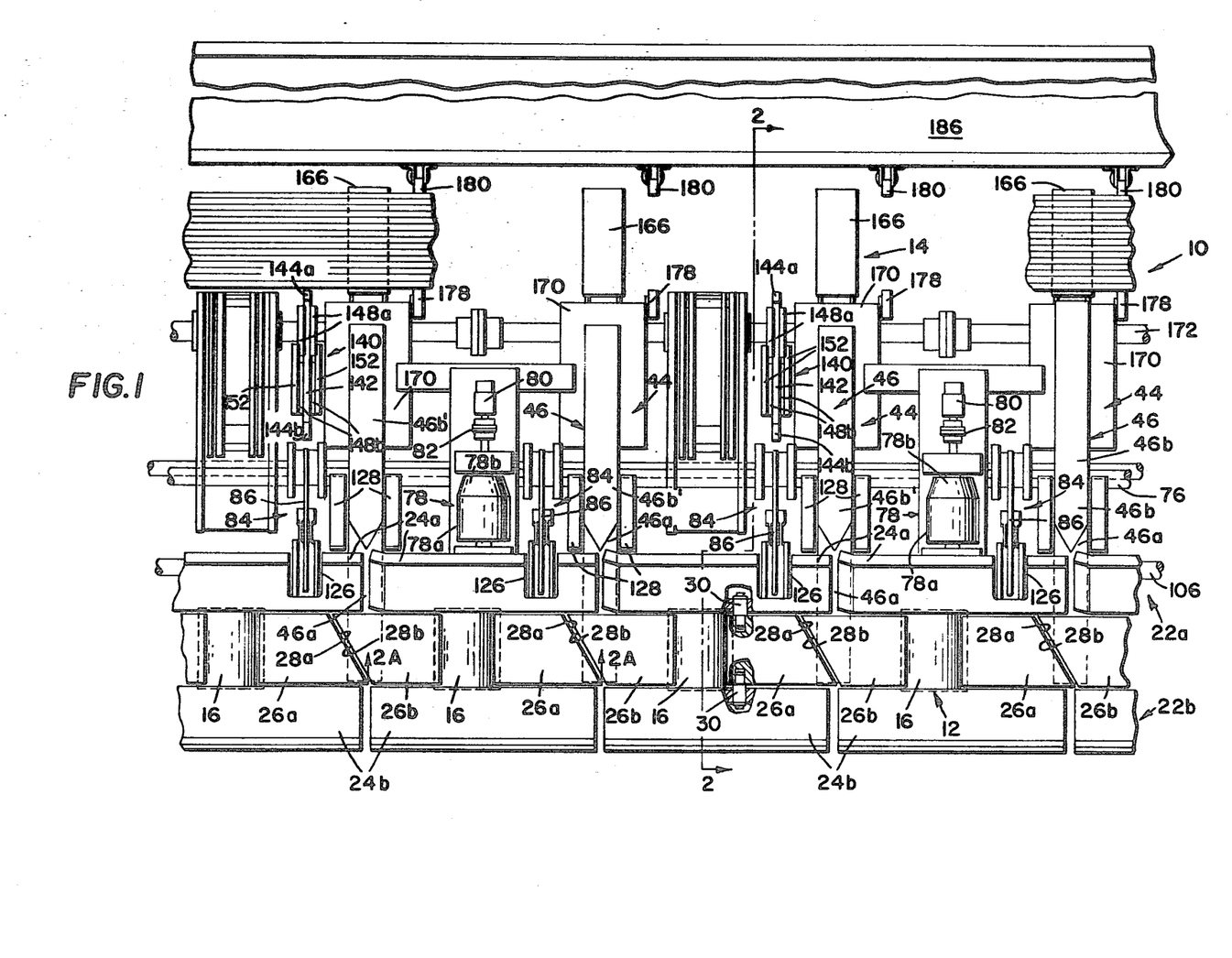
FIG. 1 is a plan view of a portion of a transfer apparatus embodying the concepts of the present invention.
Figure 2:
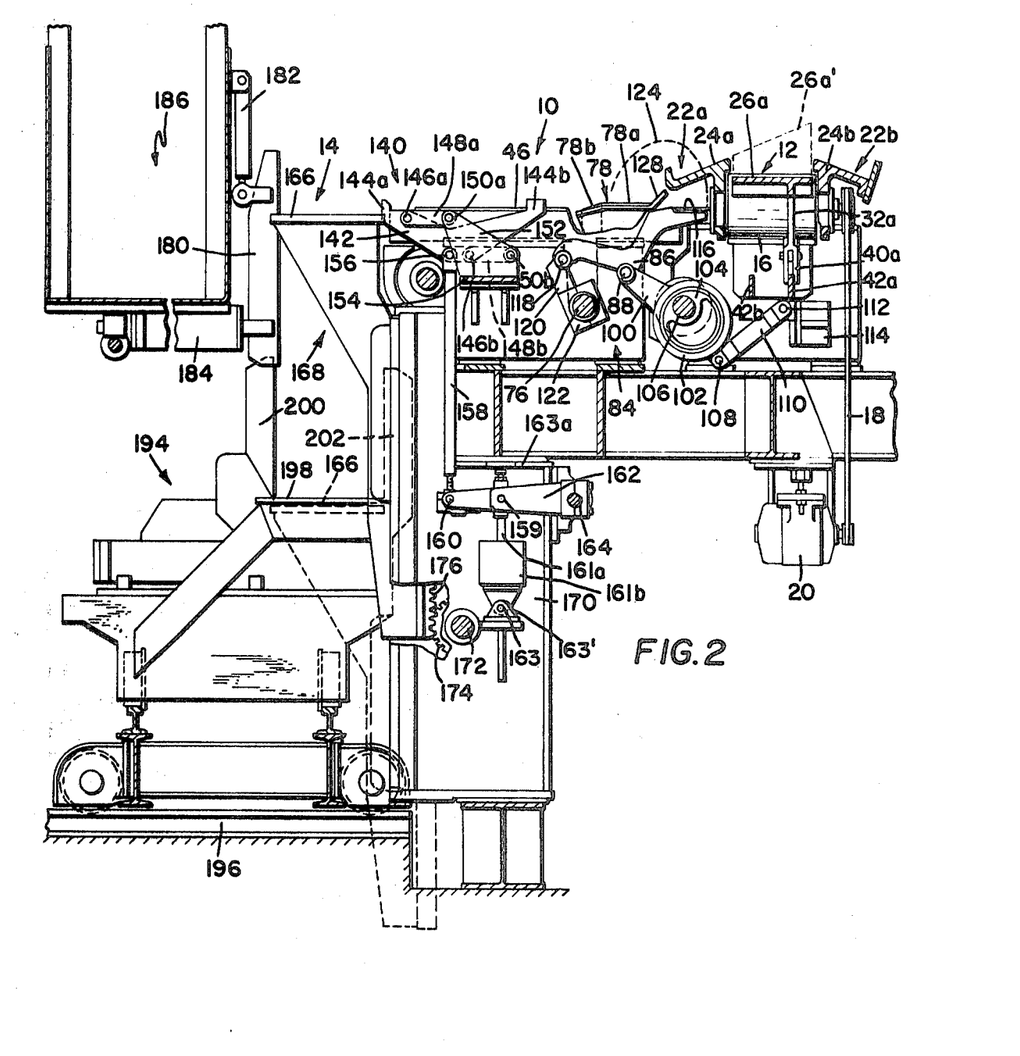
FIG. 2 is a sectional view taken along lines 2—2 of FIG. 1.

Referring initially to FIGS. 1 and 2 wherein are best shown general features of an installation embodying the concepts of the present invention, there is shown a transfer apparatus generally indicated at 10 located between a roller table 12 of the type commonly found in a rolling mill, and an elevator-type carrier 14.

The roller table 12 includes a plurality of table rollers 16, each of which is suitably driven by any known means, such as for example the belt 18 and motor 20 shown in FIG. 2. The roller table 12 is flanked on either side by a pair of sliding notches 22a and 22b, each being defined respectively by a plurality of longitudinally aligned castings 24a and 24b.

The table rollers 16 are longitudinally spaced along the length of the table 12, with a pair of apron plates 26a and 26b located between each table roller. The apron plates are each provided respectively with mating edges 28a and 28b extending diagonally across the width of the roller table 12.

Figure 2A:
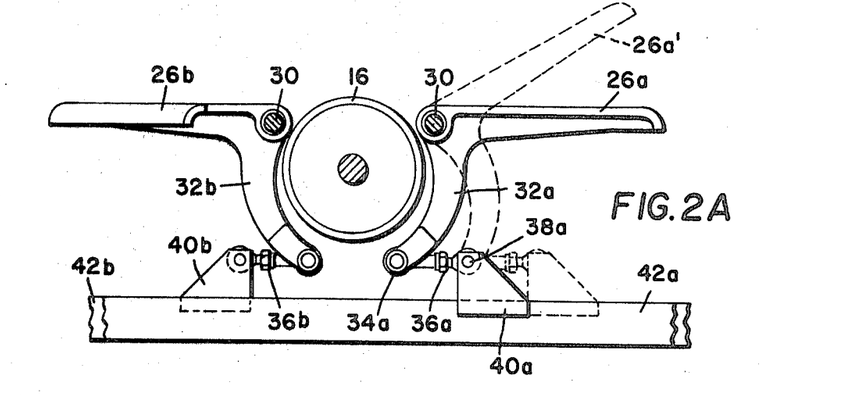
FIG. 2A is a sectional view on an enlarged scale taken along lines 2A—2A of FIG. 1.
Figure 3:
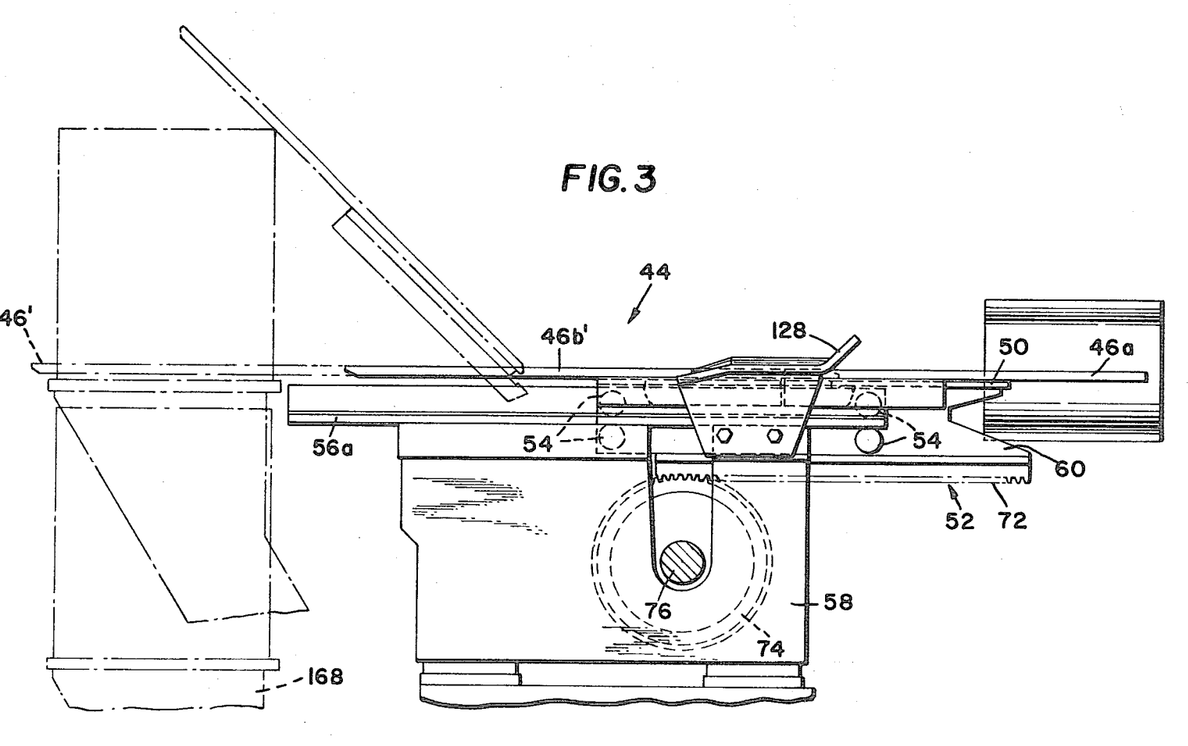
FIG. 3 is an enlarged view showing the means for advancing and retracting the element support members.

As can be best seen by a combined reference to FIG. 2A and a broken away portion of FIG. 1, each apron plate 26a is provided with a pair of axially aligned laterally extending stub shafts 30 which are journalled in suitably located bearings carried by the castings 24a and 24b. Apron plate 26a further includes a depending arm 32a which is pivotally connected as at 34a to one end of a link 36a, the other end of the link being pivotally connected as at 38a to an upstanding bracket 40a attached to a slide bar 42a. The other apron plate 26b is similarly provided with stub shafts 30 and a depending arm 32b which is in turn connected via a link 36b and bracket 40b to another slide bar 42b. When slide bar 42a is pulled to the right as viewed in FIGS. 1 and 2A, the apron plates 26a are pivoted to raised positions shown in dotted at 26a' in FIGS. 2 and 2A. This has the effect of laterally transferring an element running along roller table 12 into sliding notch 22a. By the same token movement of slide bar 42b in the opposite direction will cause the apron plates 26b to be pivotally raised with the result that an element running along table 12 will be laterally transferred into the opposite sliding notch 22b. In actual practice, notch 22b may be employed to receive scrap elements, while notch 22 operates as the primary receiver for acceptable elements.

The area between the roller table 12 and the elevator carrier 14 will hereinafter be referred to as the "receiving station." A plurality of skid assemblies generally indicated at 44 are spaced along the receiving station, each skid assembly extending laterally with respect to the length of the receiving station. As can best be seen by additional reference to FIGS. 3–6, each skid assembly 44 includes an element support member 46 which is made up of a rear section 46a and a front section which can be either a "long" or a "short," the long being indicated 46b and the short at 46b'. The reason for employing front sections having two different lengths will be explained later in the specification. The rear section 46a is attached by machine screws indicated typically at 48 to the rear horizontal plate 50 of an underlying carriage assembly generally indicated at 52. Carriage assembly 52 has a generally I-shaped cross-section; with laterally extending wheels 54 which run along parallel track members 56a and 56b, the latter being attached to and supported by an underlying stationary housing 58.

Figure 4:
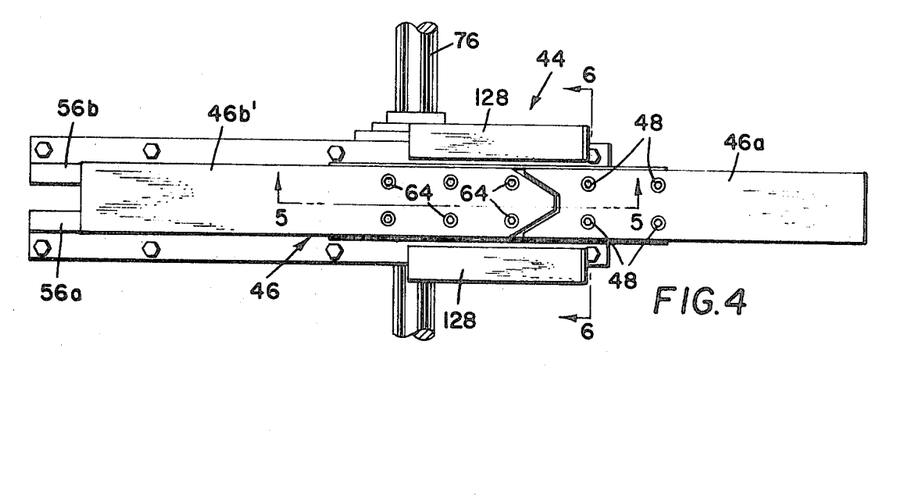
FIG. 4 is a plan view of the equipment shown in FIG. 3.
Figure 5:
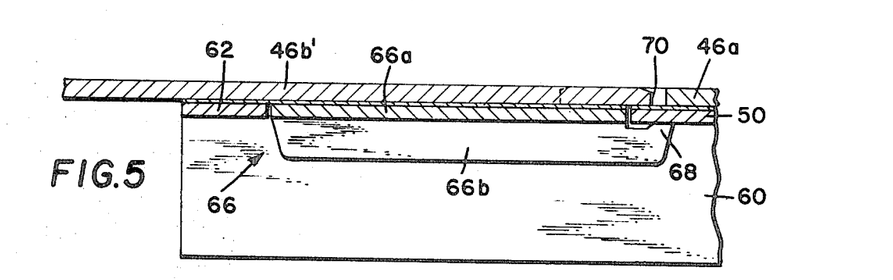
FIG. 5 is an enlarged sectional view taken along lines 5—5 of FIG. 4.
Figure 6:
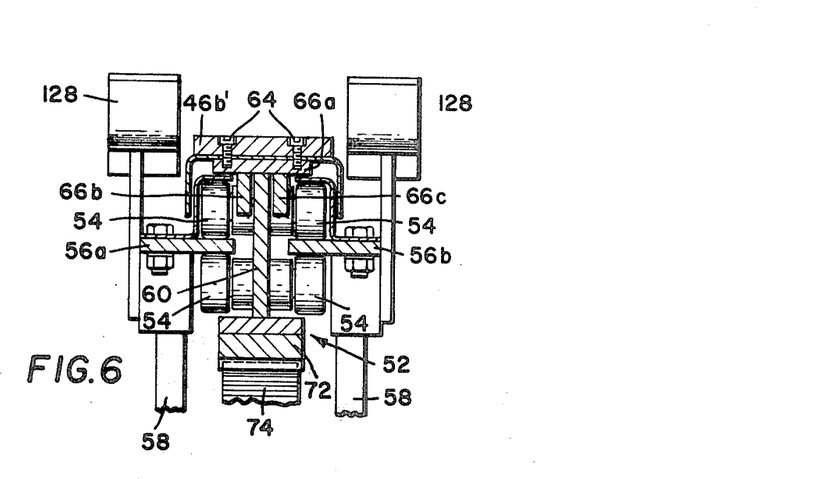
FIG. 6 is a sectional view on an enlarged scale taken along lines 6—6 of FIG. 4; and, FIGS. 7A to 7I are schematic illustrations depicting the operation of the apparatus.

The carriage assembly 52 further includes a central vertical plate 60 to which is welded the previously mentioned rear horizontal plate 50 and another forward horizontal plate 62 (see FIG. 5). The front edge of plate 50 is spaced from the rear edge of plate 62, thereby exposing the upper edge of plate 60. The front section (either 46b and 46b') of the element support member 46 is secured by machine screws 64 to an underlying weldment 66 which is made up of a horizontal top plate 66a and a pair of depending spaced parallel flanges 66b and 66c which straddle the exposed upper edge of the vertical plate 60 on the carriage assembly. Thus, when the weldment 66 is operatively positioned as shown in FIGS. 4 and 5, its upper plate 66a is in horizontal alignment with and located between plates 50 and 62. The rear ends of flanges 66b and 66c extend beyond the rear edge of plate 66a, and each is suitably shaped to provide a locking nose 68 which cooperates with the rear edge 70 of the front section 46b or 46b' to engage the front edge of plate 50, thus locating and holding the front section in place on the carriage assembly 52. The advantages to be derived from employing this means of supporting and locating the front section 46b or 46b' of the element support member 46 will be discussed presently when the operation of the apparatus is described.

Carriage assembly 52 is additionally provided along its underside with a gear rack 72 which is in meshed relationship with a pinion gear 74 carried by drive shaft 76 extending longitudinally along the length of the element receiving station. Thus it will be seen that as viewed in FIGS. 2 and 3, counterclockwise rotation of shaft 76 will cause the carriage assembly 52 and the element support member 46 carried thereon to be extended towards the left to a maximum extent indicated in dotted at 46' in FIG. 3. By the same token, clockwise rotation of shaft 76 will produce a reverse operation, causing the element supporting member 46 to be retracted to the position shown in solid lines.

As can best be seen by combined reference to FIGS. 1 and 2, a plurality of alignment rollers 78 are spaced at suitable intervals along the element receiving station. Each alignment roller is suitably journalled for rotation about an axis extending transverse of the length of the element receiving station and generally parallel to the skid assemblies 44. The alignment rollers are each suitably driven by any known means, such as for example a motor 80 connected to the roll shaft by means of a coupling 82. Each alignment roller is provided with a cylindrical section 78a and a somewhat truncated conical section 78b, the former protruding upwardly above a plane containing the upper edges of the element support members 46.

"Picker" devices generally indicated at 84 are located at suitable intervals along the element receiving station. The construction and operation of the picker devices 84 is described and claimed in U. S. Patent application Ser. No. 168,276 filed on Aug. 2, 1971 and assigned to the same assignee as the present invention. The picker devices 84 operate to shift individual elongated elements from the sliding notch 22a onto the alignment rollers 78. Each picker device includes a curved arm 86 which is pivotally connected generally at its midsection as at 88 to an arm 100 extending radially from yoke 102 which in turn surrounds an eccentric 104. The eccentric is journalled for rotation in the yoke and is itself keyed to a drive shaft 106 extending longitudinally along the element receiving station. Yoke 102 is also pivotally connected at another location as at 108 to one end of a link 110, and the other end of the link 110 is pivotally connected as at 112 to a stationary bracket 114. One end of the picker arm 86 forms an element engaging notch 116, and the other end of the arm is pivotally connected as at 118 to a short arm 120 extending laterally from a collar 122. The collar is rotatably mounted on and supported by the drive shaft 76 which powers the skid assemblies 44.

Rotation of drive shaft 106 in a clockwise direction as viewed in FIG. 2 causes the picker arms to travel in a somewhat eliptical path indicated schematically in FIG. 2 at 124. Transverse notches 126 (see FIG. 1) in the castings 24a permit the picker arms 86 to traverse the sliding notch 22a. An element at rest in sliding notch 22a is thus carried by the picker arms along path 124 and deposited on the cylindrical sections 78a of the alignment rollers 78, which are continually rotating to push each element to the left as viewed in FIG. 1. Each element is thus moved forward until its front end contacts a remote stop (not shown). While this is occurring the next subsequent cycle of the picker arms carries another element from sliding notch 22a while simultaneously pushing an element previously deposited on the alignment rollers 78 laterally to the left as viewed in FIG. 2. This causes the preceding element to slide down the truncated conical sections 78b of the alignment rollers onto the upper edges of the element support members 46. Guide members 128 are positioned on either side of the element support members 46 to insure that elongated elements being aligned on rollers 78 do not shift laterally to the right as viewed in FIG. 2, thus creating a danger of becoming wedged under the castings 24a when the picker arms 86 move upwardly to retrieve another element from sliding notch 22a.

The apparatus further includes stop means generally indicated at 140 located at spaced intervals along the element receiving station. As is best shown in FIG. 2, each stop means 140 includes a stop member 142 which has two generally upwardly inclined arms terminating at their upper ends in front and rear finger stops 144a and 144b. The stop member 142 is pivotally connected at two points as at 146a and 146b to vertically spaced pairs of links 148a and 148b, the latter in turn being pivotally connected as at 150a and 150b respectively to rigid side plates 152 carried on an underlying fixed bracket or housing 154. Each stop member 142 is additionally pivotally connected as at 156 to the upper end of a push rod 158, the bottom of which is pivotally connected as at 160 to a crank arm 162 keyed to a shaft 164. The shaft 164 underlies and extends along the length of the element receiving station. One of the crank arms 162 is connected as at 159 to the piston rod 161a of a double acting cylinder 161b, the latter being pivotally mounted as at 163 to a fixed bracket 163'. Extension and retraction of piston rod 161a causes the shaft 164 to rotate in either the clockwise or counterclockwise direction. The upper end of piston rod 161a is adjustable axially and is arranged to contact an upper horizontal plate 163a, thereby providing a means of limiting the extent to which the rod can be extended. Rotation of shaft 164 in either a clockwise or counterclockwise direction produces vertical movement of push rod 158 and corresponding vertical adjustment to the stop member 142. The links 148a and 148b cooperate with the side plates 152 in maintaining each stop member 142 in a generally horizontally disposed attitude, regardless of the vertical adjustments made thereto.

The elevator carrier 14 includes a plurality of horizontally disposed elevator platforms 166 each of which comprises the top surface of an elevator assembly generally indicated at 168 (see FIG. 2). The elevator assembly is mounted for vertical movement on an elevator housing 170 through which extends a rotatable elevator drive shaft 172. The drive shaft has mounted thereon a plurality of pinion gears 174 which are in meshed relationship with a gear rack 176 on the elevator assembly 168. Thus it will be seen that as viewed in FIG. 2, clockwise rotation of drive shaft 172 will produce an upward movement of the elevator assemblies 168 while counterclockwise rotation of shaft 172 will result in the elevator assemblies being lowered.

A plurality of vertically extending fence members 178 are mounted on the elevator housing 170 adjacent to one side of the vertical path of travel of the elevator assemblies 168. Other fence members 180 are disposed oppositely to fence members 178 on the other side of the vertical path of elevator travel. Fence members 180 are adjustably mounted by means of links 182 and piston and cylinder assemblies 184 on a walk-way 186 extending the length of the apparatus. The fence members 178 and 180 provide lateral support for the tiers of elements to be deposited on the elevator platforms 166.

A transfer car 194 having a plurality of stock receiving cradles is located beneath the walk-way 186. The transfer car is mounted on tracks 196 for movement in a lateral direction towards and away from the apparatus. The transfer car is provided with horizontal support beds 198 and upstanding laterally spaced supports 200 and 202. When the elevator assemblies 168 are lowered to their lowermost position with the elevator platforms below the level of the support beds 198 on the transfer car 194, as indicated ih dotted at 166' in FIG. 2, a stack of tiered elements is thus transferred from the elevator platforms 166 onto the transfer car 194 for lateral removal away from the apparatus.

The operation of the apparatus will now be described with particular reference to the schematic illustrations contained in FIGS. 7A to 7I. Beginning with FIG. 7A, the apparatus is shown at one stage in its operation with a given element, herein shown as an angle $E_1$ running along the roller table 12 on the driven rollers 16. The element support members 46 are fully retracted, the stop members 142 are lowered to the inoperative position and the picker arms 86 are at their lowermost point of travel. The elevator platforms 166 are shown with one tier of elements deposited thereon. The elevators are at a slightly lowered position beneath the level "L" of the element support members 46, and in this position are ready to accept the next tier.

Figure 7A:
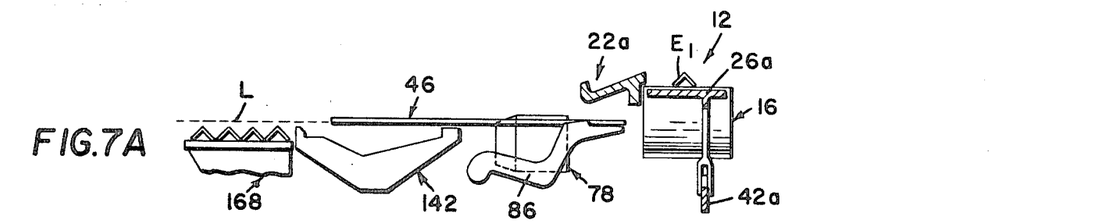
Figure 7B:
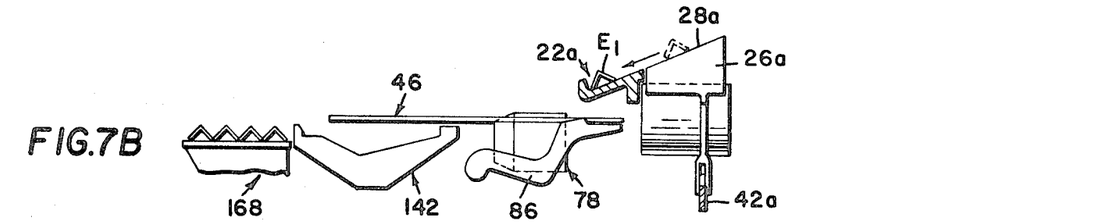
Figure 7C:
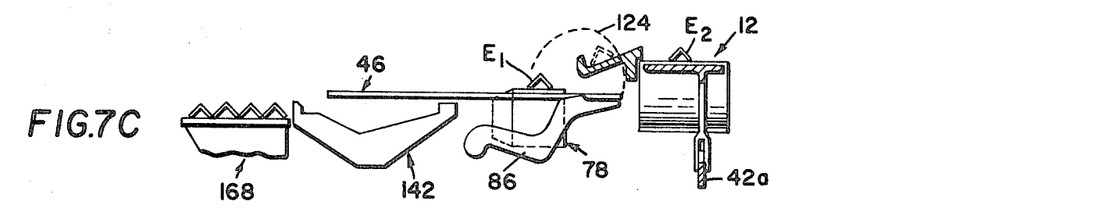

FIG. 7B depicts the transfer of the moving element $E_1$ from the roller table 12 into the sliding notch 22a. This is accomplished by pulling slide bar 42a to raise the apron plates 26a to their operative positions as shown. When this occurs, an element moving along roller table 12 is contacted by the inclined forward edges 28a of the apron plates, the latter acting collectively as a ramp which causes the product to slide laterally in the direction indicated into notch 22a.

After being deposited in notch 22a, element $E_1$ will slide to rest. While this is occurring, the apron plates 26a will be returned to their horizontal positions and the next element $E_2$ will begin running onto table 12. After element $E_1$ has come to rest in notch 22a, the picker arms 86 are operated along the path depicted schematically in FIG. 7C at 124, thus traversing notches 126 in the castings 24b and transferring element $E_1$ onto the slowly rotating alignment rollers 78. Once on the alignment rollers 78, the element $E_1$ is advanced towards a remote stop which serves as a means of aligning the front ends of the elements being handled by the apparatus. While this is occurring, the apron plates 26a are again operated in the manner previously described to transfer element $E_2$ into the sliding notch 22a.

Figure 7D:
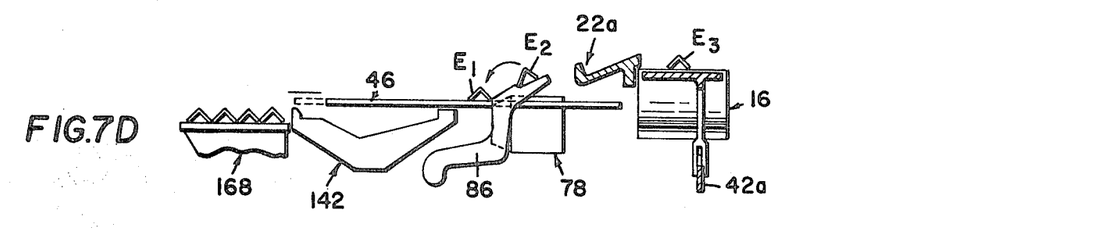

FIG. 7D depicts a subsequent stage showing the picker arms 86 in the process of clearing element $E_2$ from sliding notch 22a. As the picker arms pass through the latter part of their strokes, they push element $E_1$ laterally off the alignment rollers 78 and onto the laterally disposed element support members 46. Once this has been accomplished, the element support members are advanced a short distance as indicated in dotted in FIG. 8D to make room for the next subsequent element.

Figure 7E:
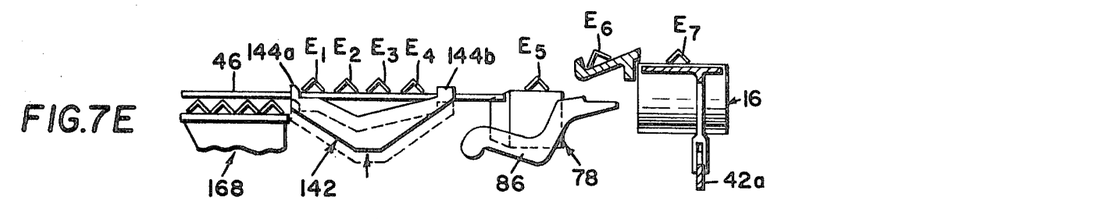

FIG. 7E shows a subsequent stage in the operation of the apparatus after four elongated elements $E_1 - E_4$ have been deposited on the element support members 46, the latter having been extended each time an element has been shifted thereon from the alignment rollers. It will be observed that the four elements $E_1 - E_4$ are now located over the stop members 142. At this stage, the stop members are elevated to their operative positions as shown by the solid lines in FIG. 7E, thus positioning the front stop 144a on one side of the elements and the rear stops 144b on the other side. Other elements $E_5$, $E_6$ and $E_7$ are also being processed by the apparatus as shown in the drawings.

Figures 7F, 7G:
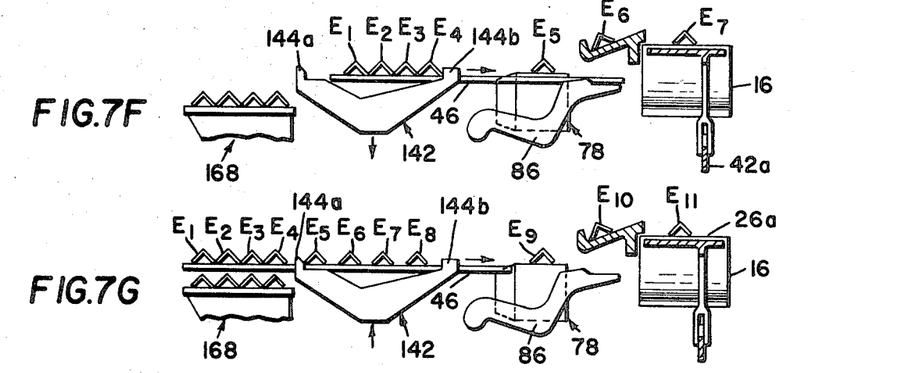

Referring next to FIG. 7F, it will be seen that the next step involves a retraction of the element support members 46 back to their initial positions as shown in FIG. 7A. Retraction of members 46 causes the elements $E_1 - E_4$ to be packed together against the rear stops 144b. Once this has been accomplished, the stop members 142 are lowered back to their inoperative positions.

FIG. 7G shows another subsequent stage in the operation of the apparatus at which the element support members 46 have again been extended to receive elements $E_5 - E_8$, the latter having been deposited on the members 46 in the same manner as that described above in relation to members $E_1 - E_4$. At this stage, the members $E_5 - E_8$ are located above the stop members 142. The stop members are then raised to their operative positions, and the element support members 46 are again retracted.

Figure 7H:
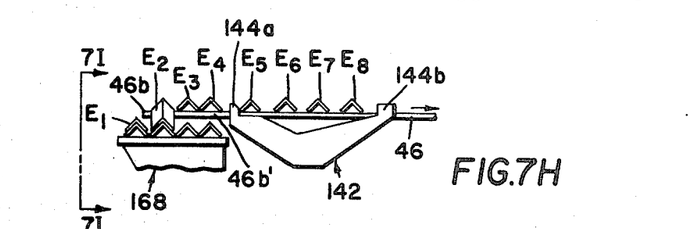
Figure 7I:
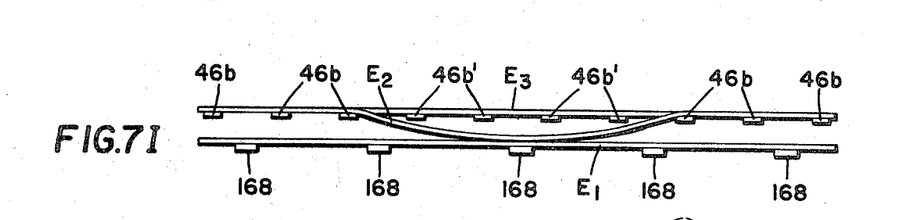

As is best shown by combined reference to FIGS. 7H and 7I, retraction of the element support members 46 from their extended positions as shown in FIG. 7G accomplishes two objectives: first, the elongated elements $E_5 - E_8$ are again laterally packed by virtue of the restraining action provided by rear stops 144b. Secondly, the elements $E_1 - E_4$ are individually stripped off of the ends of the element support members onto the preceding tier on the elevator carriers 168. In FIGS. 7H and 7I, element $E_1$ is shown deposited on and nested over an underlying element on the elevator carriers 168. The middle portion of element $E_2$ is also stripped off of the shorter front sections 46b' of the elements support members and thus has been allowed to sag downwardly into a nested relationship on the underlying element. However, the end sections of the element $E_2$ remain supported on the long sections 46b of the element support members. Continued retraction of the element support members 46 eventually results in the end portions of the element E₂ being stripped from the long front sections 46, while the middle portion of the next element E₃ is next stripped off of the short front sections 46b'.

In other words, by employing element support members 56 having front sections 46b' and 46b of different lengths, with the longer sections underlying the end portions of the elements and the shorter sections underlying the middle portions of the elements, the middle portions are allowed to sag downwardly before the end portions are released, and this in turn avoids any possibility of the elements twisting or tipping as they are stripped off of the element support members 46. Thus, each tier of elements deposited on the elevator carriers 168 assumes a properly aligned relationship, thereby producing a stack of elements having a uniforn cross-section and arrangement. This operation might be modified slightly by reversing the location of the front sections 46b' and 46b so that the longer sections underlie the middle of the elements being handled, and the shorter sections underlie the ends of the elements. In this way, the ends of the elements would droop down beofre the middles, with essentially the same result, namely, an avoidance of twisting or tipping.

It will now be evidence to those skilled in the art that a number of important advantages can be derived from employing an apparatus as described above. Among these advantages is the ability to maintain a tier of elongated elements in horizontal and lateral alignment during the transfer thereof from a receiving station to a position overlying a laterally adjacent carrier. Another advantage lies in the ability to individually strip elements off of the element support members onto the elevator carriers in a manner which avoids twisting or tipping of the elements. Additionally, and with particular reference to FIG. 3, it should be noted that in the event that the elevator carriers 168 are inadvertently raised to a level such that their upper support surfaces, or the product stacked thereon, contact the undersides of the element support members, the forward sections of the element support members will pivotally disengage themselves from the rear sections 46a and pivot upwardly as shown by the dotted lines in FIG. 3, thus avoiding damage to the element support members and their underlying tracks and operating mechanisms. The removable nature of the front sections 46b and 46b' further permits their repositioning in a rapid and efficient manner to accommodate different length elements.

It is our intention to cover all changes and modifications of the embodiment herein shown for purposes of disclosure which do not depart from the spirit and scope of the invention as defined by the claims appended hereto.

We claim:

1. Apparatus for transferring elongated elements from a receiving station to an adjacent carrier located on one side of the receiving station, said apparatus comprising: a plurality of support members spaced along and extending laterally relative to the length of the receiving station at a level above that of the carrier, each of said support members having a front section and a rear section, said rear section being secured to an underlying carriage assembly mounted for movement along track means, said front section being removably attached to said carriage assembly by means which permits the front section to pivot upwardly relative to said rear section and said carriage assembly in the event that the front section is subjected to an upward force; operating means associated with said carriage assemblies for advancing and retracting said support members between a receiving position at the receiving station and a delivery position overlying the carrier; stop means at the receiving station; elevational means for moving said stop means between a raised operative position protruding between said support members above said level and a lowered inoperative position beneath said level, whereupon after elongated elements have been laterally arranged in a tier on said support members at the receiving position, said support members are advanced by said operating means to the delivery position, thus placing the elements over the carrier, said stop means are raised by said elevational means to the operative position and said support members are then retracted by said operating means to the receiving position, thereby causing the elongated elements to be stripped by said operatively positioned stop means off of said support members and onto the carrier.

2. The apparatus as claimed in claim 1 wherein said support members are non-uniform in length, with the longest support members being located under the end sections of the elongated elements deposited thereon, and with the shortest support members being located under the middle sections of the elongated elements, whereupon when the support members are withdrawn from the delivery position to the receiving position with the stop means raised to the operative position, the middle section of each elongated element will be stripped from the shortest of the support members before the end sections of the same element are stripped from the longest of the support members.

3. The apparatus as claimed in claim 1 wherein said operating means includes a gear rack on each of said carriage assemblies, each of said gear racks being in meshed relationship with a pinion gear mounted on a common drive shaft extending along the length of said receiving station.

4. Apparatus for transferring elongated elements from a receiving station to an adjacent carrier located on one side of the receiving station, said apparatus comprising: a plurality of support members spaced along and extending laterally relative to the length of the receiving station at a level above that of the carrier; operating means for advancing and retracting said support members between a receiving position at the receiving station and a delivery position overlying the carrier; a plurality of elongated stop members located at suitable intervals along said receiving station between selected pairs of said support members, the said stop members extending laterally across the receiving station in parallel relationship with said support members, each of said stop members having front and rear stops extending vertically from the ends thereof; elevational means for moving said stop members between raised operative positions at which said stops protrude upwardly above said level and between said support members and lowered inoperative positions beneath said level, whereupon after elongated elements have been laterally arranged in a tier on said support members at the receiving position, said support members are advanced by said operating means to the delivery position, thus placing at least some of the elements over the carrier, said stop members are raised by said elevational means to the operative positions and said support members are then retracted by said operating means to the receiving position, thereby causing elongated elements to be stripped by said front stops off of said support members and onto the carrier, while elongated members located between said front and rear stops are packed together by the retaining action of said rear stops.

5. The apparatus as claimed in claim 4 wherein each of said stop members has pivotally connected thereto pairs of link members, the said link members in turn being pivotally connected to stationary support means, whereupon said link members and said stationary support means cooperate with said stop member to maintain said stop members horizontally disposed during adjustments thereof between said raised operative position and said lowered inoperative position.

6. The apparatus as claimed in claim 5 wherein said elevational means is comprised of push rods, each being pivotally connected at one end to one of said stop members and at the other end of one of a plurality of cranks, the other ends of said cranks being keyed to a rotatable shaft extending longitudinally along said receiving station, said means for rotation said shaft in either a clockwise or counterclockwise direction.

7. Apparatus for transferring elongated elements from a receiving station to an adjacent carrier located on one side of the receiving station; said apparatus comprising: laterally extending support members spaced along the length of the receiving station at a level slightly above that of the carrier, each said support members including a rear section attached to a carriage assembly which is in turn movably mounted on stationary track means, and a front section removably connected to said carriage assembly by means which permit the front section to pivot upwardly relative to said carriage assembly and said rear section in the event that the front section is subjected to an upward force, the front sections of said support members being nonuniform in length with the longest being positioned for location under the end sections of elongated elements deposited thereon and the shortest being positioned for location under the middle sections of the elongated elements; stop means at said receiving station; elevational means for adjusting said stop means between a raised operative position protruding upwardly between said support members above said level and a lowered inoperative position beneath said level, whereupon after elongated elements have been laterally arranged in a tier on said support members at said receiving station, said support members are advanced to the delivery position, thus placing the elements over said carrier, said stop means is raised to the operative position and said support members are then retracted to the receiving position, thereby causing the elongated elements to be stripped by said operatively positioned stop means off of said support members and onto said carrier, the middle sections of the elongated elements being allowed to drop towards said carrier prior to the end sections due to the aforementioned non-uniform lengths of the front sections of said support members.

* * * * *